United States Patent
Aria et al.

(10) Patent No.: US 8,310,380 B2
(45) Date of Patent: Nov. 13, 2012

(54) SELECTABLE COMMUNICATION INTERFACE CONFIGURATIONS FOR MOTION SENSING DEVICE

(75) Inventors: Behrad Aria, Alameda, CA (US); David Sachs, Sunnyvale, CA (US); Joseph Seeger, Menlo Park, CA (US)

(73) Assignee: Invensense Inc., Sunnyvale, CA (US)

( * ) Notice: Subject to any disclaimer, the term of this patent is extended or adjusted under 35 U.S.C. 154(b) by 466 days.

(21) Appl. No.: 12/716,139

(22) Filed: Mar. 2, 2010

(65) Prior Publication Data

US 2011/0215952 A1 Sep. 8, 2011

(51) Int. Cl.
*H03M 11/00* (2006.01)
(52) U.S. Cl. .......................................... 341/20; 345/172
(58) Field of Classification Search .................. 345/172, 345/175, 176; 341/20; 710/9
See application file for complete search history.

(56) References Cited

U.S. PATENT DOCUMENTS

| | | | | |
|---|---|---|---|---|
| 5,920,024 A | * | 7/1999 | Moore | 84/609 |
| 6,425,029 B1 | * | 7/2002 | Hoffman | 710/104 |
| 7,136,957 B2 | * | 11/2006 | Somervill et al. | 710/316 |
| 7,991,938 B2 | * | 8/2011 | Park et al. | 710/307 |
| 8,085,062 B2 | * | 12/2011 | Gaskins et al. | 326/30 |

* cited by examiner

*Primary Examiner* — Brian Young
(74) *Attorney, Agent, or Firm* — Sawyer Law Group, P.C.

(57) ABSTRACT

Selectable communication interface configurations for motion sensing devices. In one aspect, a module for a motion sensing device includes a motion processor connected to a device component and a first motion sensor, and a multiplexer having first and second positions. Only one of the multiplexer positions is selectable at a time, where the first position selectively couples the first motion sensor and the device component using a first bus, and the second position selectively couples the first motion sensor and the motion processor using a second bus, wherein communication of information over the second bus does not influence a communication bandwidth of the first bus.

32 Claims, 8 Drawing Sheets

SELECTABLE COMMUNICATION INTERFACE CONFIGURATIONS FOR MOTION SENSING DEVICE

BACKGROUND OF THE INVENTION

Handheld electronic devices are used in a wide variety of applications and environments. The ubiquity of such devices as mobile phones, digital still cameras and video cameras, handheld music and media players, portable video game devices and controllers, mobile internet devices (MIDs), personal navigation devices (PNDs), and other handheld devices speaks the popularity and desire for these types of devices. However, controlling the multitude of functions of a handheld device can often be awkward or clumsy, due to the small size of the devices. For example, handheld devices with a button input or touch screen typically require two hands of the user to be effectively used, as well as the close attention of the user when operating the device.

Motion sensors, such as inertial sensors like accelerometers or gyroscopes, can be used in handheld electronic devices. Accelerometers can be used for measuring linear acceleration and gyroscopes can be used for measuring angular velocity of a moved handheld electronic device. The markets for motion sensors include mobile phones, video game controllers, personal digital assistants (PDAs), mobile internet devices (MIDs), personal navigational devices (PNDs), digital still cameras, digital video cameras, remote controls, and many more. For example, mobile phones may use accelerometers to detect the tilt of the device in space, which allows a video picture to be displayed in an orientation corresponding to the tilt. Video game console controllers may use accelerometers to detect motion of the hand controller that is used to provide input to a game. Picture and video stabilization is an important feature in even low- or mid-end digital cameras, where lens or image sensors are shifted to compensate for hand jittering measured by a gyroscope. Global positioning system (GPS) and location based service (LBS) applications rely on determining an accurate location of the device, and motion sensors are often needed when a GPS signal is attenuated or unavailable, or to enhance the accuracy of GPS location finding.

Motion sensing devices provide data communication with various device components in the device using communication interfaces. This communication is often implemented using standard interfaces such as multidrop interfaces that allow multiple device components to be connected to a single bus, and which implement master and slaves on the bus to communicate data. For example, an application processor can act as a master to communicate with other slave components over such a bus. However, in motion sensing devices some data, such as motion data, is required to be communicated at a much faster rate than other types of data to be able to provide accurate sensing of the motion of the device. One problem is that such faster communication can disrupt the communication of other devices on the bus, leading to bottlenecks in data flow and disrupted communications. Dedicated interfaces can be used to provide such faster communication; however, dedicated interfaces allowing such communication are not standardized and limit the market for device components specialized for such interfaces.

SUMMARY OF THE INVENTION

The invention of the present application relates to communication interfaces for motion sensors. In one aspect, a module for a motion sensing device includes a motion processor connected to a device component and a first motion sensor, and a multiplexer having first and second positions. Only one of the positions is selectable at a time, where the first position selectively couples the first motion sensor and the device component using a first bus, and the second position selectively couples the first motion sensor and the motion processor using a second bus, wherein communication of information over the second bus does not influence a communication bandwidth of the first bus.

In another aspect, a motion sensing device includes a plurality of device components, the device components including a motion sensor operative to sense motion of the motion sensing device; a sensor bridge including a motion processor; and an application processor. At least one bus connects each device component to one or more of the other device components. The motion sensing device includes a multiplexer that has first and second positions, only one of the positions being selectable at a time, the first position selectively coupling the motion sensor and the application processor using a first bus, and the second position selectively coupling the motion sensor and the motion processor using a second bus, wherein communication of information over the second bus does not influence a communication bandwidth of the first bus.

In another aspect, a method for providing communication between device components in a motion sensing device includes providing a multidrop bus connection between at least two of the device components of the motion sensing device. It is determined that a motion processor of the device components is to receive motion data from a motion sensor of the device components. At least one multiplexer of the motion sensing device is changed such that the multidrop bus connection is severed for the motion sensor and a different bus connection is established between the motion processor and the motion sensor to communicate the motion data from the motion sensor to the motion processor, wherein communication of information over the different bus connection does not influence a communication bandwidth of the multidrop bus connection.

Aspects of the described inventions include a motion sensing device including one or more selectable buses that allow communication in a motion sensing device to be provided over selectable buses. For example, the selectable buses can allow standardized multidrop bus communication for components as well as point-to-point communication between desired components. This allows flexibility in selecting efficient communication between components and allows higher-rate communication between particular components to be performed without disturbing communication bandwidth for other device components.

DETAILED DESCRIPTION

The present invention relates generally to motion sensing devices, and more specifically to communication interfaces used in a motion sensing device. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
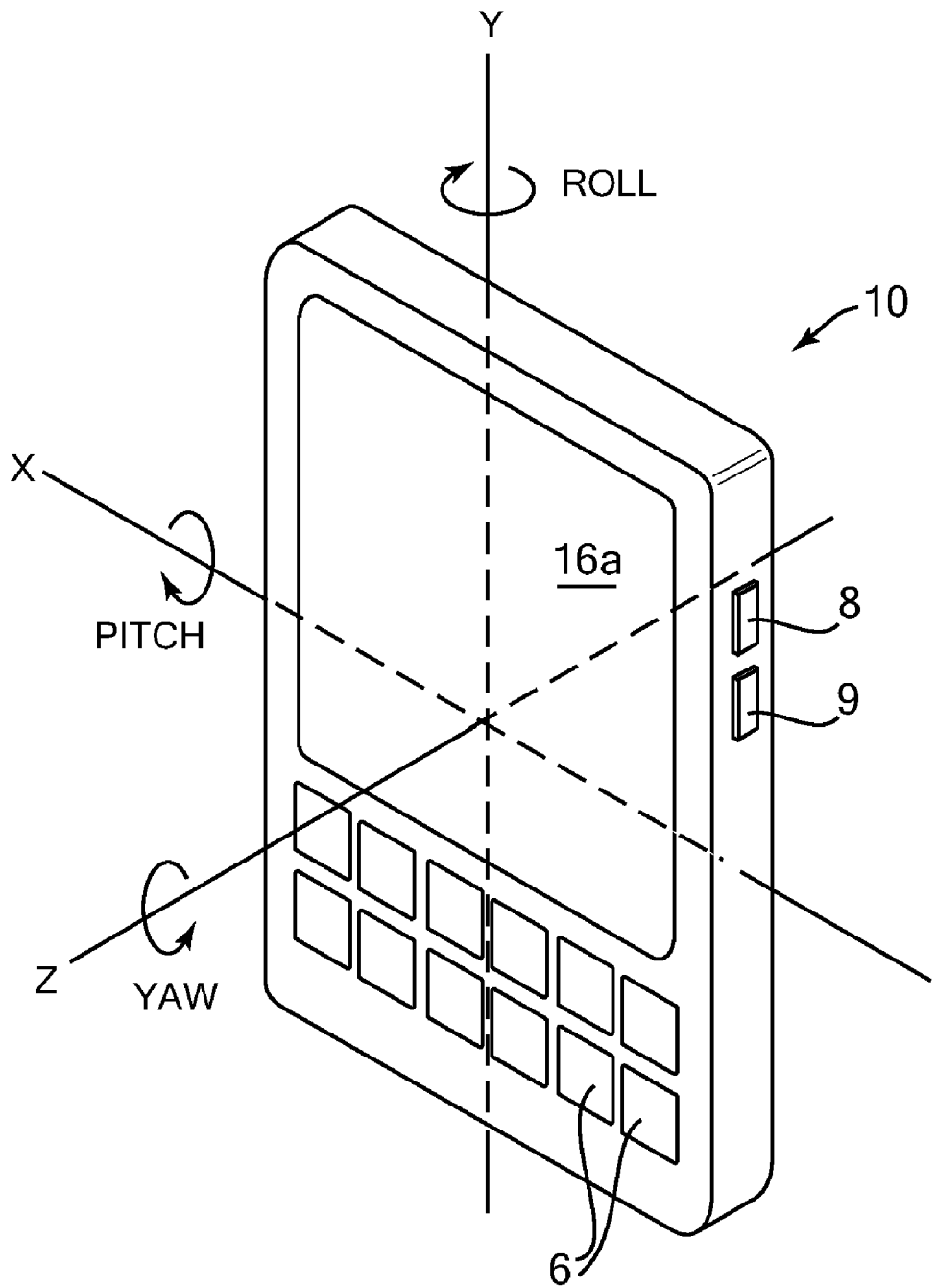
FIG. 1 is a perspective view of one example of a motion sensing device suitable for use with the present inventions.

FIG. 1 is a perspective view of one example of a motion sensing device 10 suitable for use with aspects of the inventions described herein. Device 10 can be held in one or more hands of a user to be operated, and can include a variety of different functions, as described below. As used herein, the terms "include," "including," "for example," "e.g.," and variations thereof, are not intended to be terms of limitation, but rather are intended to be followed by the words "without limitation." In the example embodiment shown, device 10 can include a display screen 16a, and physical buttons 6. Furthermore, some embodiments can include one or more buttons 8 and 9 on one or both sides of the device 10, which can be pressed and/or held by the user, for example, to allow motion gestures to be input in different modes of operation to change different states of the device. Other embodiments of motion sensing devices can alternatively be used, and can include different and/or additional input and output devices, as described below with respect to FIG. 2.

In this example embodiment, the device 10 can be moved by the user in space, and this movement is detected by motion sensors of the device. Rotation of the device 10 can include, for example, pitch, roll, and yaw about the various rotational axes, as shown in FIG. 1. These axes can be defined differently in other embodiments. Furthermore, linear motions can be made along the linear axes x, y and z. Furthermore, these axes can be defined at various different positions on the device (for example translated or rotated with respect to the axes shown in FIG. 1, or otherwise transposed into any other coordinate system (whether rectangular, polar, or otherwise)), as appropriate for the hardware and software used by the device 10.

Figure 2:
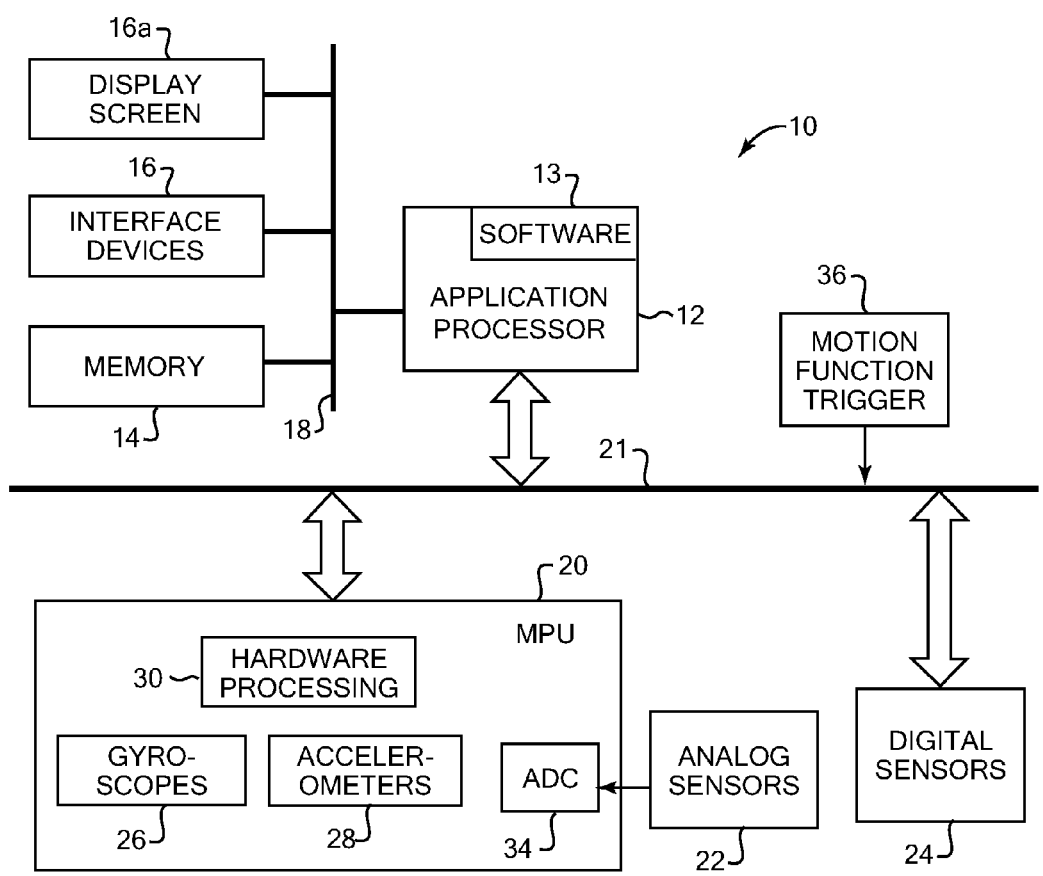
FIG. 2 is a block diagram of one embodiment of a motion sensing system suitable for use with the present inventions.

FIG. 2 is a block diagram of one example of device 10 or a motion sensing system suitable for use with aspects of the present invention. Device 10 can be implemented as a device or apparatus, such as a handheld device that can be moved in space by a user and its motion and/or orientation in space therefore sensed. For example, such a handheld device can be a mobile phone (e.g., cellular phone, a phone running on a local network, or any other telephone handset), wired telephone (e.g., a phone attached by a wire), personal digital assistant (PDA), video game player, video game controller, navigation device, mobile internet device (MID), personal navigation device (PND), digital still camera, digital video camera, binoculars, telephoto lens, portable music, video, or media player, remote control, or other handheld device, or a combination of one or more of these devices. In some embodiments, the device 10 is a self-contained device that includes its own display and other output devices in addition to input devices. In other embodiments, the handheld device 10 only functions in conjunction with a non-portable device such as a desktop computer, electronic tabletop device, server computer, etc. which can communicate with the moveable or handheld device 10, e.g., via network connections. The device may be capable of communicating via a wired connection using any type of wire-based communication protocol (e.g., serial transmissions, parallel transmissions, packet-based data communications), wireless connection (e.g., electromagnetic radiation, infrared radiation or other wireless technology), or a combination of one or more wired connections and one or more wireless connections.

Device 10 includes an application processor 12, memory 14, interface devices 16, a motion processing unit 20, analog sensors 22, and digital sensors 24. Application processor 12 can be one or more microprocessors, central processing units (CPUs), or other processors which run software programs for the device 10 or for other applications related to the functionality of device 10. For example, different software application programs such as menu navigation software, games, camera function control, navigation software, and phone or a wide variety of other software and functional interfaces can be provided. In some embodiments, multiple different applications can be provided on a single device 10, and in some of those embodiments, multiple applications can run simultaneously on the device 10. In some embodiments, the application processor implements multiple different operating modes on the device 10, each mode allowing a different set of applications to be used on the device and a different set of gestures to be detected.

Multiple layers of software can be provided on a computer readable medium such as electronic memory or other storage medium such as hard disk, optical disk, flash drive, etc., for use with the application processor 12. For example, an operating system layer can be provided for the device 10 to control and manage system resources in real time, enable functions of application software and other layers, and interface application programs with other software and functions of the device 10. A motion algorithm layer can provide motion algorithms that provide lower-level processing for raw sensor data provided from the motion sensors and other sensors. A sensor device driver layer can provides a software interface to the hardware sensors of the device 10.

Some or all of these layers can be provided in software 13 of the processor 12. For example, in some embodiments, the processor 12 can implement gesture processing and recognition based on sensor inputs from a motion processing unit (MPU™) 20 (described below). Other embodiments can allow a division of processing between the MPU 20 and the processor 12 as is appropriate for the applications and/or hardware used, where some of the layers (such as lower level software layers) are provided in the MPU. For example, in embodiments allowing processing by the MPU 20, an API layer can be implemented in layer 13 of processor 12 which allows communication of the states of application programs running on the processor 12 to the MPU 20 as well as API commands (e.g., over bus 21), allowing the MPU 20 to implement some or all of the gesture processing and recognition described herein. Some embodiments of API implementations in a motion detecting device are described in co-pending U.S. patent application Ser. No. 12/106,921, incorporated herein by reference in its entirety.

Device 10 also includes components for assisting the application processor 12, such as memory 14 (RAM, ROM, Flash, etc.) and interface devices 16. Interface devices 16 can be any of a variety of different devices providing input and/or output to a user, such as a display screen, audio speakers, buttons, switch, touch screen, joystick, slider, knob, printer, scanner, camera, computer network I/O device, other connected peripheral, etc. For example, one interface device 16 included in many embodiments is a display screen 16*a* for outputting images viewable by the user. Memory 14 and interface devices 16 can be coupled to the application processor 12 by one or more buses 18. For example, memory and devices 16 can be coupled via a dedicated bus, and/or other devices can use a shared bus.

Device 10 also can include a motion processing unit (MPU™) 20. The MPU is a device including motion sensors that can measure motion of the device 10 (or portion thereof) in space. For example, in some embodiments the MPU can include motion sensors that measure one or more axes of rotation and/or one or more axes of acceleration of the device. In preferred embodiments, at least some of the motion sensors are inertial sensors, such as gyroscopes and/or accelerometers. In some embodiments, some of the components to perform these functions are integrated in a single package. The MPU 20 can communicate motion sensor data to an interface bus 21, e.g., I2C or Serial Peripheral Interface (SPI) bus, to which the application processor 12 is also connected. In one embodiment, processor 12 is a controller or master of the bus 21. Some embodiments can provide bus 18 as the same bus as interface bus 21. Other details and embodiments of communication buses are described below.

The motion sensors of device 10 can include one or more rotational motion sensors 26 and one or more linear motion sensors 28. The MPU 20 can include one or more sensors 26, or one or more sensors 28. In some embodiments, both types of motion sensors can be included in the MPU. In one implementation, the rotational motion sensors 26 sense rotational rate around at least one axis and linear acceleration along at least one axis of the respective sensor and/or the device. In one embodiment, a set of three rotational motion sensors senses rotational rate around at least three axes and can, for example, consist of three sensors, or a different number of sensors in other embodiments. In one embodiment, the linear motion sensors 28 sense linear acceleration along at least one axis and linear acceleration along at least one axis of the respective sensor and/or the device. In one embodiment, a set of three rotational motion sensors can sense linear acceleration along at least three axes and can, for example, consist of three sensors, but in other embodiments there could be any other number of such linear sensors.

For example, in some embodiments, inertial motion sensors can be used. The rotational motion sensors can be gyroscopes and the linear motion sensors can be accelerometers. The motion sensors sensing rotational rate, such as gyroscopes, may be implemented using a variety of technologies, including Micro Electro Mechanical Systems, piezoelectric, hemispherical resonator, tuning fork, quartz, carbon nanotubes, any other technology capable of producing devices that can sense motion of a rotational nature, or any combination of the foregoing. Accelerometers are widely known in the art and can be implemented using any known accelerometer manufacturing technology, any other technology capable of producing devices capable of sensing acceleration, or any combination of the foregoing.

From one to three gyroscopes can typically be provided, depending on the motion that is desired to be sensed in a particular embodiment. Some implementations may employ more than three gyroscopes, for example to enhance accuracy, increase performance, or improve reliability. Some gyroscopes may be dynamically activated or deactivated, for example to control power usage or adapt to motion processing needs. Accelerometers 28 can measure the linear acceleration of the device 10 (or portion thereof) housing the accelerometers 28. From one to three accelerometers can typically be provided, depending on the motion that is desired to be sensed in a particular embodiment. Some implementations may employed more than three accelerometers and/or gyroscopes, for example to enhance accuracy, increase performance, or improve reliability. Some accelerometers may be dynamically activated or deactivated, for example to control power usage or adapt to motion processing needs. For example, if three gyroscopes 26 and three accelerometers 28 are used, then a 6-axis sensing device is provided providing sensing in all six degrees of freedom. In embodiments with more than three gyroscopes and/or more than three accelerometers, additional degrees of freedom (or sensing axes) can be provided, and/or additional sensor input can be provided for each of the six axis of motion. In some embodiments, a single chip six-axis inertial measurement unit is used in the MPU 20; other embodiments may provide only some of the sensors in the MPU 20 and other sensors external to the MPU. In some embodiments, additional or alternate types of rotational rate sensors and/or linear acceleration sensors can be used.

In some embodiments, the set of motion sensors sensing rotational rate around at least three axes and linear acceleration along at least three axes are integrated in a single module. In one implementation, the module is integrated in a single package, or otherwise enclosed in a single package. The single package module could consist of a single chip, or could include multiple individual devices that are integrated together in a common package. Examples of such multiple individual devices that may be integrated together in a common package include two or more dies that are attached to each other or otherwise integrated together, a printed circuit board (possibly including additional circuitry), a system on a chip (SOC), or any other combination of devices.

In some embodiments the gyroscopes 26 and/or the accelerometers 28 can be implemented as MicroElectroMechanical Systems (MEMS). For example, two or more gyroscopes or two or more accelerometers can be integrated into a MEMS sensor wafer. Other embodiments may integrate more or less inertial sensors. Supporting hardware such as storage registers for the data from motion sensors 26 and 28 can also be provided. Some embodiments may include one or more of the accelerometers and/or gyroscopes separate from a package.

In some embodiments, the MPU 20 can also include a hardware "motion processor" or processing block 30. Motion processor 30 can include logic, microprocessors, or controllers to provide processing of motion sensor data in hardware. For example, motion algorithms, or parts of algorithms, may be implemented by processor 30 in some embodiments, and/or part of or all the gesture recognition described herein. In such embodiments, an API can be provided for the application processor 12 to communicate desired sensor processing tasks to the MPU 20, as described above. Some embodiments can provide a sensor fusion algorithm that is implemented by the motion processor 30 to process all the axes of motion of provided sensors to determine the movement of the handheld electronic device in space. Some embodiments can include a hardware buffer in the processor 30 to store sensor data received from the motion sensors 26 and 28. One or more motion function triggers 36, such as buttons 6, 8, 9 or other control, can be included in some embodiments to control the input of gestures to the electronic device 10, and which can be used to augment the operation of a subsystem capable of facilitating interaction with the device. In one implementation, when a user activates or deactivates the motion function trigger, the motion function trigger produces a signal which alters the state, context or operation of the subsystem capable of facilitating interaction with the device (e.g., activating or deactivating a particular function on the device, activating or deactivating some or all of the subsystem capable of facilitating interaction with the device).

Examples of an MPU, integrated sensor units, and systems suitable for use with the present invention are described in co-pending U.S. patent application Ser. Nos. 11/774,488 and 12/106,921, all incorporated herein by reference in their entireties. Suitable implementations for MPU 20 in device 10 are available from InvenSense, Inc. of Sunnyvale, Calif.

The device 10 can also include other types of sensors which may be used with the communication interface of the present invention. Analog sensors 22 and digital sensors 24 can be used to provide additional sensor data about the environment in which the device 10 is situated. For example, sensors such one or more barometers, compasses or magnetometers, temperature sensors, optical sensors (such as a camera sensor, infrared sensor, etc.), ultrasonic sensors, radio frequency sensors, or other types of sensors can be provided. For example, a compass or magnetometer sensor can provide an additional one, two, or three axes of sensing, such as two horizontal vectors and a third vertical vector. In the example implementation shown, digital sensors 24 can provide sensor data directly to the interface bus 21, while the analog sensors can be provide sensor data to an analog-to-digital converter (ADC) 34 which supplies the sensor data in digital form to the interface bus 21. In the example of FIG. 2, the ADC 34 is provided in the MPU 20, such that the ADC 34 can provide the converted digital data to hardware processing 30 of the MPU or to the bus 21. In other embodiments, the ADC 34 can be implemented elsewhere in device 10.

The various device components of the device 10 can communicate using a communication interface having one or more selectable buses of the present invention, which are described in greater detail below. Communications may include any type of data and/or commands, including motion data determined by the sensors, instructions for the sensors (e.g., directions to power down and power up, adjust operation, etc.), and any other data relating to the operation or functionality of subsystems or sensors. The motion data may be preprocessed (i.e., synchronized among the multiple sensors in time) or raw (i.e., raw data could be made available to an external processor for separate processing, whether by itself or in addition to the preprocessed data).

Figure 3:
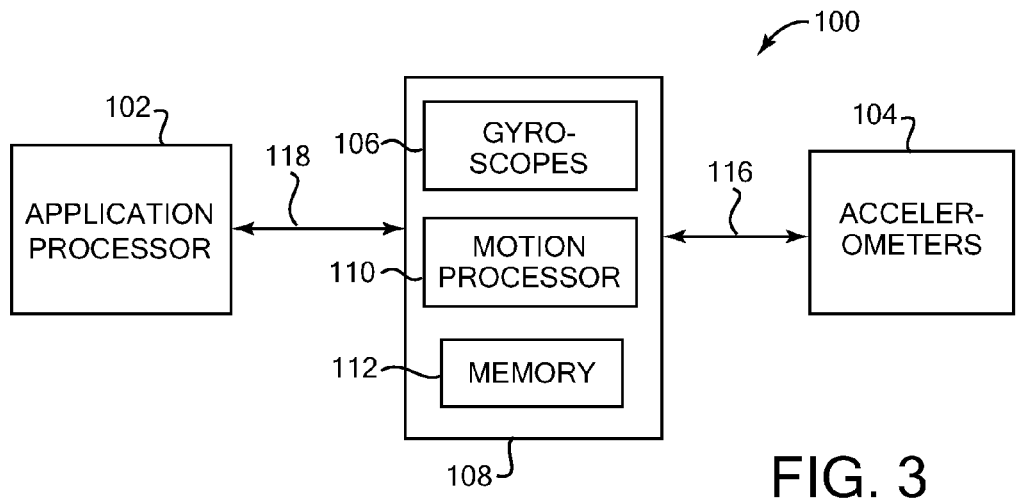
FIG. 3 is a block diagram of a motion processing system implementing a point-to-point, dedicated bus interface for communication between device components.

FIG. 3 is a block diagram of a motion processing system 100 implementing a point-to-point, dedicated bus interface for communication between device components. System 100 includes an application processor 102, as well as motion sensors such as accelerometers 104 and gyroscopes 106. In the described embodiment of FIG. 3, gyroscopes 106 are integrated in a module 108 which also includes a motion processor 110 and can include other components such as memory 112, while the accelerometers are provided external to the module 108.

The system 100 processes motion data from motion sensors 104 and 106 at required rates to provide accurate sensing of device motion. In some embodiments, the accelerometers 104 can provide motion data to the motion processor 110 of module 108 at a faster rate to allow faster and more responsive sensing for a responsive device. In contrast, other communication between device components, such as between the module 108 and the application processor 102, can in many embodiments be provided at a much slower rate. In one example, communication between accelerometers 104 (or other motion sensors) and the motion processor 110 is about 125 Hz to allow the motion processor to update algorithms at that higher frequency, while the communication between motion processor 110 and application processor 102 need only be about 15 Hz to update applications and/or other processes on the application processor. The fast communication can be achieved with a dedicated bus 116 between accelerometers 104 and module 108, while slower communication can be provided by a separate dedicated bus 118 between module 108 and application processor 102. This use of separate dedicated buses allows the faster communication to occur on its own bus and not affect the bandwidth of communication on the other bus.

A disadvantage with the system 100 is that the dedicated interfaces between module 108 and other components are typically specific to particular implementations and not generic. Thus, for example, a module 108 with such a specialized interface may not be compatible with some systems that use a single generic or standardized system bus. Also, the system configuration may not be flexible enough to accommodate other or different device components. Furthermore, if the application processor 102 desires to communicate with the accelerometers, e.g. to receive sensor data or to send configuration information to the accelerometers, it must do so by communicating via the module 108, which creates extra signal processing and can slow down the communication.

Figure 4:
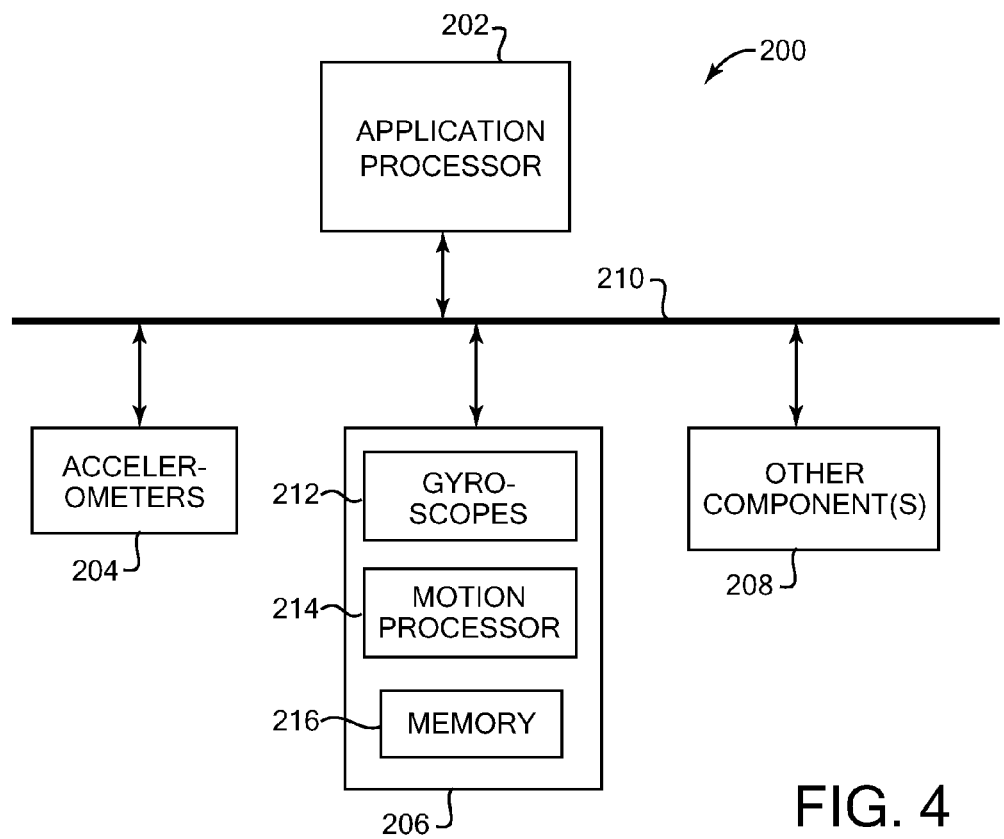
FIG. 4 is a block diagram illustrating a motion sensing system having a multidrop bus interface for communication between device components

FIG. 4 is a block diagram illustrating a motion sensing system 200 having a multidrop bus interface for communication between device components. Similarly to system 100, system 200 includes an application processor 202, accelerometers 204, a module 206, and other component(s) 208. In the example embodiment shown, the module 206 includes gyroscopes 212 and can include a motion processor 214, memory 216, and other components and functions. System 200 can also include other components 208, such as peripheral devices, input/output devices, other sensors, etc.

Each of the device components of system 200 is connected to a multidrop bus 210 so that they can communicate with each other. A multidrop bus allows all device components to be connected to the same bus, with each device component listening for data intended to be received by that component. In some embodiments, the multidrop bus 210 is a master-slave type of bus. For example, an I2C bus can be used as multidrop bus 210. In embodiments where multidrop bus 210 is a master-slave bus, one or more of the components of the system 200 can be designated a master which sends and receives data from other components designated as slaves. For example, a master issues a clock and addresses the slaves, and the slaves receive the clock and address. The master can request to either send information to or receive information from one or more slaves. In some embodiments, any number of master nodes can be designated, and master and slave roles may be changed between messages.

The system 200 allows communications between components using a standardized multidrop bus, so that a wide variety of device components and configurations can be used and additional components added or other components removed. However, a disadvantage of the system 200 is that the bandwidth of multidrop bus 210 is fully shared between the various device components. This can be a problem when two device components use a lot of bandwidth to communicate, since that communication may use a large amount of bandwidth on the multidrop bus and cause disruptions on the multidrop bus for other device components attempting to communicate. One example in a motion sensing system is communication between separate motion sensors, such as accelerometers 204, and the motion processor 214 that requires receiving motion data from the sensors at a high rate to perform processing on the data.

Figure 5:
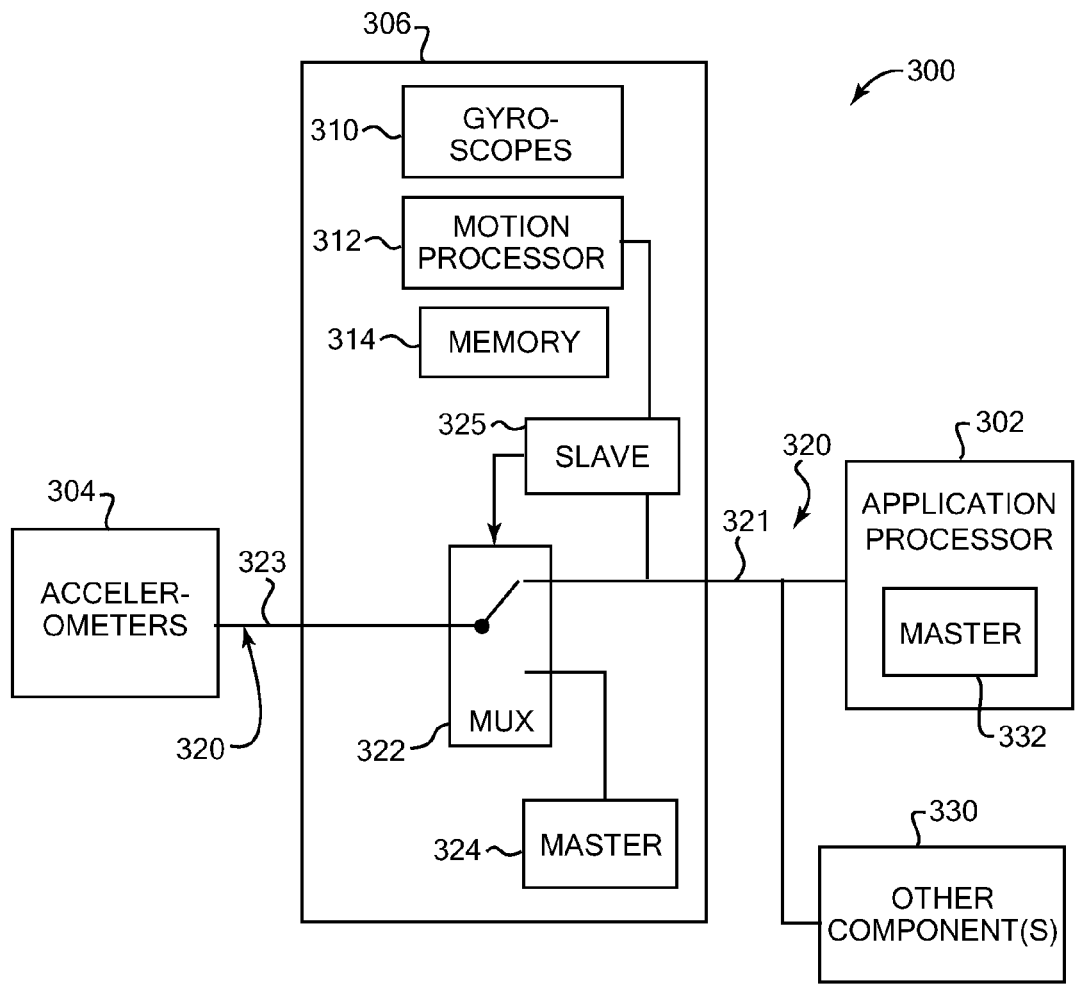
FIG. 5 is a block diagram illustrating a motion sensing device of the present invention which includes a selectable communication interface in multidrop and point-to-point configurations.

FIG. 5 is a block diagram illustrating a motion sensing device 300 which includes a selectable communication interface of the present invention allowing efficient and flexible communication of motion processing system components. System 300 includes a number of device components, where a "device component" herein designates any component or subsystem of the device 300 which communicates with other components or subsystems. For example, the device components can include an application processor 302, accelerometer(s) 304, a processing module 306, and other components 330 as shown in the example of FIG. 5. Processing module 306 can be a single, integrated package that includes one or more device components, or the module 306 itself can be considered a device component (as in the example described here). In the embodiment shown, module 306 includes motion sensors such as gyroscopes 310, and also includes a motion processor 312, memory 314, buffers (not shown), etc. In other embodiments, the module 306 can instead or additionally include one or more of the accelerometers 304, and/or one or more of the gyroscopes 310 can be separate from the module 306, or the module 306 can be separate from both the accelerometers and the gyroscopes and other sensors. The accelerometers block 304 and gyroscopes block 310 can each include one or more of the appropriate motion sensors, each block collectively acting as a device component. Alternatively, each motion sensor, such as each accelerometer or gyroscope, can be individually considered to be a device component. Other device component(s) 330 can include other sensors, and/or peripherals such as power management devices, input devices, output devices, etc.

The device components of FIG. 5 can operate as described above with respect to FIGS. 2-4. In one example, the accelerometers 304 and gyroscopes 310 provide motion data to the motion processor 312, and the motion processor 312 communicates with the application processor 302, such as providing higher-level commands and/or data, receiving commands from the application, or other communication as described above and in co-pending U.S. patent application Ser. No. 12/106,921, incorporated herein by reference. Some embodiments can provide other or additional communication, such as between application processor 302 and motion sensors, etc.

In some embodiments, the processing module 306 is capable of substantially synchronizing in time motion data produced by some or all sensors of the device. In one embodiment, the module 306 buffers such motion data, e.g. using buffers in the module 306, and makes it available to any other device component that may utilize the data. Examples of such other devices components can include an external processor or an external application, such as application processor 302 and/or an application running on that processor. In one embodiment, the module includes a motion processor 312 (whether hardware, software, firmware or a combination of these) that can process internally the motion data produced by the motion sensors, thereby possibly reducing processing requirements outside the module. The motion processor 312 can use memory 314 internal or external to the processor 312 for the processing, in some embodiments. In various implementations, the module may further include one or more other processors, DSPs, memory, and any other circuitry. The processor 312 and/or other processing components can alternatively be partially or completely provided elsewhere in the device 300 and connected via appropriate buses to sensors or other components.

Module 306 is connected to separate, external motion sensors (accelerometers 304 in this example, but can be gyroscopes or other types of sensors in other embodiments) and to application processor 302 by a selectable bus 320 of the present invention. Selectable bus 320 includes a bus section 323 connected from motion sensors (here, accelerometers 304) to a multiplexer 322 (or other type of switch) provided in the module 306. Alternatively, the multiplexer 322 can be provided external to the module 306 in the system 300. Other embodiments can include additional components, such as sensors, connected to the bus section 323 in a multidrop bus configuration. Another bus section 321 of selectable bus 320 is connected from the multiplexer 322 to other device components of the system 300, such as application processor 302 and/or other component(s) 330. A master 324 in the module is also connected to the multiplexer 322 and to the motion processor 312 (most connections between components in module 306 are not shown). The multiplexer 322 can be controlled by the application processor 302, or the motion processor 312, or other logic or processor provided in the module 306 or external to the module 306 within the system 300.

Multiplexer 322 operates as a switch having two positions, one position selectable at a time. The multiplexer is switched to control the communication between device components based on buses that have been selected by the multiplexer. In the described embodiment, the different buses correspond to different operating bus modes of the system 300. A slave 325 is connected by a bus to the bus section 321 and by a bus to the motion processor 312. The slave 325 is also connected to the multiplexer 322 by a multiplexer select line. The slave 325 receives instructions from the master 332 in application processor 302 as to how to control the bus mode. The slave 325 informs the motion processor 312 of the desired mode on a bus and controls the multiplexer via the multiplexer select line to switch to the position that implements the mode. In some embodiments, the communication between slave 325 and motion processor 312/multiplexer 322 is not using the same protocol as used on the bus 320 or its sections, e.g. not I2C in embodiments using I2C for bus section 321.

A first operating bus mode is a multidrop mode, where the selectable bus 320 is part of a multidrop bus connected to the accelerometers 304. In this mode, the multiplexer 322 is switched to connect the bus section 323 with the bus section 321 and disconnect the master 324 from the bus section 323. In this configuration, the selective bus 320 operates as a multidrop bus for accelerometers 304, where the accelerometers 304 are connected to the multidrop bus and can communicate with other device components connected to the bus section 321, such as the application processor 302 and other component(s) 330. This allows, for example, the bus master 332 of the application processor 302 to be used to coordinate communications with accelerometers 304 acting as a slave. In some embodiments, this mode disconnects the module 306 from the application processor 302 so that the motion processor 312 cannot communicate over the bus 320 to the application processor 302 or the sensor 304. In other embodiments, although the master 324 is disconnected at the multiplexer 322, the module 306 can still be connected to the bus section 321 for communication of the module 306 with components connected to the bus section 321 as a multidrop bus. For example, slave 325 in module 306 is connected to the bus section 321. In other embodiments, a slave in module 306 can be connected to a bus separate from bus 321 that connects other components, or connected via a dedicated bus directly to another component such as application processor 302. The slave 325 can receive communications from the master 332 in application processor 302 or other masters on bus 321.

A second operating bus mode can be provided as a point-to-point mode, where the selectable bus 320 acts as a point-to-point bus connected between the accelerometers 304 and the module 306, and the multidrop connection to the application processor (and other components) is bypassed or cut. The multiplexer 322 is controlled to switch the connections such that the bus master 324 in the module 306 is connected to the bus section 323 and to the accelerometers 304, and the bus section 321 of the bus 320 is disconnected from the accelerometers 304. In this mode, the module 306 can in some embodiments still be connected to the bus section 321 and/or application processor 302 using a bus such as bus 334 connected to bus section 321 and connected to the slave 325 in the module 306, or a separate direct, point-to-point bus to the application processor and connected to the slave 325. For example, in some embodiments, a point-to-point connection can be provided between accelerometers 304 and module 306, and another point-to-point connection provided between module 306 and application processor 302.

The master 324 becomes the bus master of a direct, point-to-point connection between the module 306 and the accelerometers 304. This configuration or mode allows the accelerometers 304 to communicate directly with the motion processor 312 of module 306 at a higher-frequency data rate without taking any bandwidth away from other components such as application processor 302 or components 330 on the multidrop bus section 321; these other device components can use the section 321 of bus 320 that is disconnected from the point-to-point portion 323 of the bus 320 between accelerometers 304 and module 306, to communicate with each other over the multidrop bus. In one example, the motion processor 312 receives data from the accelerometers 304 (and from gyroscopes 310) at 125 Hz to run algorithms at that rate, while the application processor 302 need only communicate with device components at 15 Hz. The point-to-point bus configuration thus allows device components to talk to each other directly, without having to talk to the application processor 302 or use bandwidth on a multidrop bus.

The selectable bus 320 of the present invention allows all of the device components of the system 300 to be of a standard type compatible with a multidrop bus, such as I2C. Thus, for example, the accelerometers 304 can be a standardized component with a communication port compatible with I2C or other standard protocol, and yet the accelerometers can still be provided with direct, point-to-point bus functionality as needed in the system to process accelerometer data for the motion sensing device, without affecting communication of other device components.

The buses of the present invention can be implemented using any wired or wireless communication technology, including electrical transmissions (e.g., serial, parallel, or packet-based communications), optical transmissions (e.g., optical fiber, optical switching matrix, optical free-space transmissions), or wireless transmissions (e.g., ultra-wideband, local wireless network, Bluetooth). The protocols used can include standard protocols (e.g., i2c), or may be a proprietary protocol (possibly encrypted).

The buses described herein can facilitate communications between two motion sensor subsystems, and/or between individual sensors included in the two motion sensor subsystems. Communication protocols such as I2C and SPI are typically used for inter-chip communication. Communications may include motion data generated by the sensors, instructions for the sensors (e.g., directions to power down for power conservation, directions to power up, directions to adjust operation, etc.), and any other sensor-related data or data relating to the operation or functionality of the subsystems or sensors. The motion data generated by the sensors and transmitted via a bus such as point-to-point bus 323 or multidrop bus 321 may be preprocessed (i.e., synchronized among the multiple sensors in time) or raw (i.e., raw data could be made available to a processor such as motion processor 312 or application processor 302 for separate processing, whether by itself or in addition to the preprocessed data). In one embodiment, synchronization in time of the motion data produced by any two or more of the sensors ensures that the information received from the sensors is representative of the state of the device and nature of motion at any particular point in time. In other embodiments, one or more of the motion sensor subsystems have the ability to pass data directly to the multidrop bus (or other external bus) from some or all of the motion sensors, possibly with no synchronization, no buffering, or no other motion data pre-processing.

Figure 6:
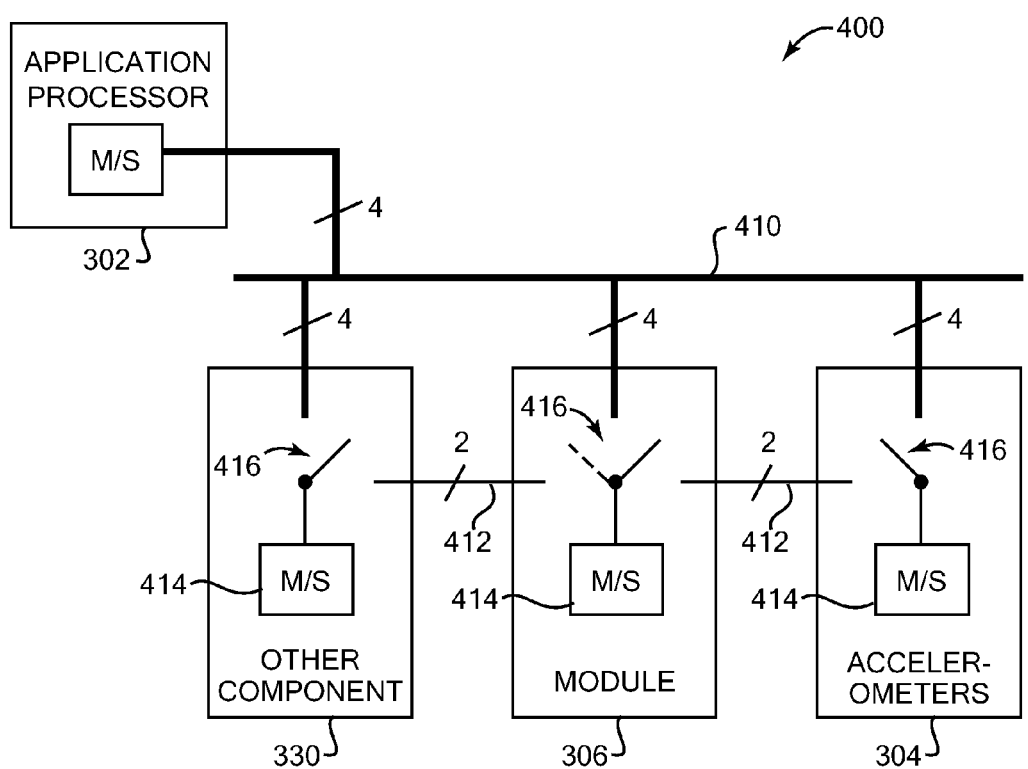
FIG. 6 is a block diagram illustrating one embodiment of a system of the present invention that implements selectable buses of the present invention in multidrop and point-to-point configurations for a motion sensing device.

FIG. 6 is a block diagram illustrating another embodiment 400 of a system of the present invention that implements selectable buses of the present invention for a motion sensing device. In this example, an application processor 302, accelerometers 304, a module 306, and other component(s) 330 (any suitable device component) are each connected to multiple buses and operate as described above. One of the buses is a multidrop bus 410, where each device component is connected to the multidrop bus 410 and can communicate with each other over this bus. In the example shown, the multidrop bus 410 includes 4 lines, allowing 4 bits of parallel communication, but any number of lines and bits can be used in different embodiments.

The system 400 also includes separate multiple point-to-point buses 412, i.e. direct buses, provided between desired device components. For example, the system 400 includes a point-to-point bus 412 connecting the accelerometers 304 and the module 306, allowing direct communication between these device components. A point-to-point bus 412 is also shown between module 306 and other component 330. In the example shown, the point-to-point buses 412 each include 2 lines, allowing 2 bits of parallel communication, but any number of lines and bits can be used in different embodiments. The point-to-point buses 412 allow fast communication between the connected device components without reducing bandwidth in the multidrop bus 410. Thus, the required fast data communication between accelerometers 304 and module 306 can proceed while communication between the application processor 302 and other components 330 over multidrop bus 410 is unaffected.

Each device component is shown including a master/slave 414 and a multiplexer 416. The master/slave 414 can act as a master on the multidrop bus 410 or act as a slave on this bus, as the communication requires. The multiplexer 416 in an associated device component can be switched between the multidrop bus 410 and one or more of the direct buses 412 which are available in that device component. In some embodiments, some components such as module 306 is able to switch to two components, such as components 330 and 304, to allow communication between component 330 and 304 through module 306 if the multidrop bus 410 is disconnected from these components.

A master component on the multidrop bus can, for example, start or terminate a transaction with a slave component, or can interrogate a slave component to instruct the slave to allow reading from or writing to the slave. The slave component typically can only respond to master requests or instructions. For example, the multidrop bus configuration can be used to allow the synchronization of motion sensor data by the motion processor. The application processor 302, as master, can instruct the gyroscope module 306 to generate a clock signal, and can instruct the accelerometers 304 to look for this clock signal and use the clock to synchronize the output of accelerometer motion data with gyroscope motion data.

Figure 7:
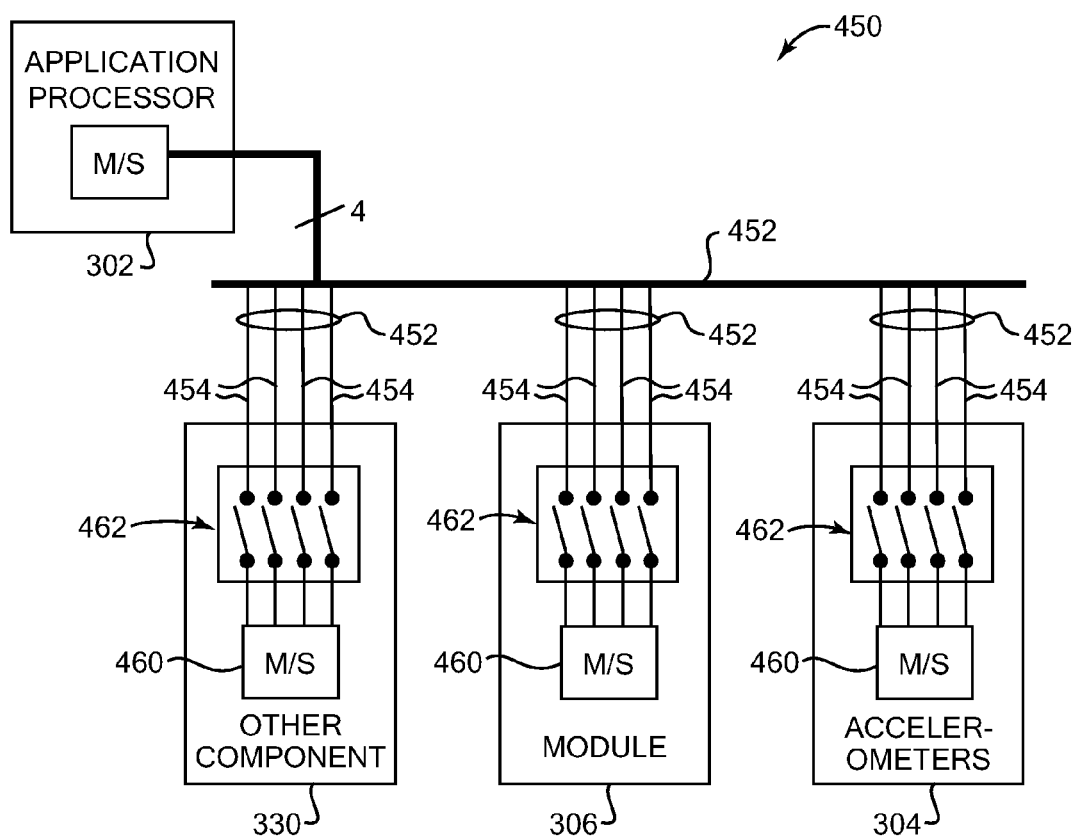
FIG. 7 is a block diagram illustrating a second embodiment of a system of the present invention that implements selectable buses in multidrop and point-to-point configurations for a motion sensing device.

FIG. 7 is a block diagram illustrating another embodiment of a system 450 of the present invention that implements selectable buses for a motion sensing device. In this example, an application processor 302, accelerometers 304, a module 306, and other component(s) 330 (any suitable device component) are each connected to a combined bus 452. The combined bus 452 includes number of individual lines 454 to allow a multidrop bus and a point-to-point bus to be implemented. In this example, the multidrop bus uses all of the lines of the entire combined bus 452 and has a greater number of connections/lines than the point-to-point bus, while the point-to-point bus uses only a subset of the connections and lines of the combined/multidrop bus 452. For example, if four lines are provided in the bus 452, the multidrop bus can use all 4 lines as shown, while the point-to-point bus can use two lines of the set of 4 lines of the bus. This implementation saves a number of pins and lines that would be required if the multidrop bus and the point-to-point bus were provided as separate buses, as in the embodiment described above with respect to FIG. 6. In other embodiments, the multidrop or point-to-point buses may have a different number of lines, or the point-to-point bus may have a greater number of lines than the multidrop bus.

Each device component can be connected to the combined selectable bus 452. In the example of FIG. 7, each component includes a master/slave 460 and a multiplexer 462. The multiplexer 462 in a device component can include switches to select a number of lines in the bus 452 to implement the desired type of bus. Thus the multiplexer can be used to switch between a multidrop bus and a direct bus connected to that device component. In the example embodiment, the multiplexer switches can be controlled to connect to the total 4 lines of the multidrop bus, or the multiplexer switches can be controlled to connect to 2 of the lines of bus 452 to connect the point-to-point bus. If set to the multidrop bus, the master/slave 460 of that device component can act as a master on the multidrop bus or act as a slave on this bus, as the communication requires. If the multiplexer 460 selects the point-to-point bus, then the associated device component can communicate directly with another device component that has also switched its master/slave 460 to a point-to-point bus. When a point-to-point bus is being used, the multidrop bus cannot be used, since two of the lines are being used for the point-to-point bus. In some embodiments, the multidrop bus can be used by other components while the point-to-point buses are being used, e.g., if the placement of devices on the bus 452 is ordered so that buses having a point-to-point connection are provided at the end of the bus, such that multidrop devices are not disconnected when a point-to-point bus is selected. Or, point-to-point lines and multidrop lines of the bus 452 can be designed to coexist and operate concurrently, e.g. using time division multiplexing or other method.

Figure 8:
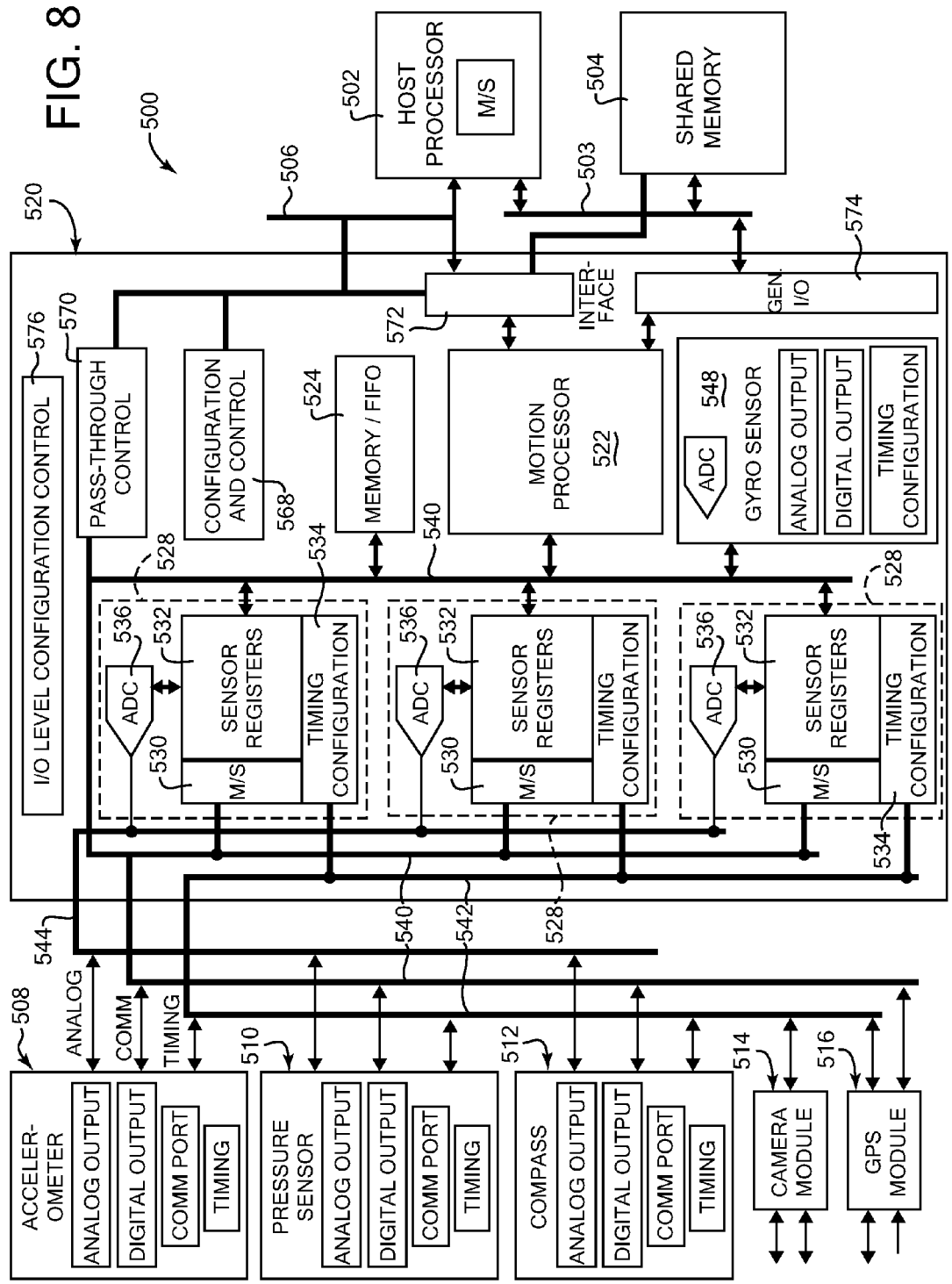
FIG. 8 is a block diagram illustrating a third embodiment of a system of the present invention that implements selectable buses in multidrop and point-to-point configurations for a motion sensing device.

FIG. 8 is a block diagram illustrating another embodiment of a system 500 of the present invention that implements selectable buses for a motion sensing device, in which communication of information on one bus can be selected to not affect a communication bandwidth between components of a different bus. In this embodiment, a universal sensor bridge is provided between one or more sensors of a device and a host processor.

System 500 includes a host processor 502 and a shared memory 504. Host processor 502 can be similar to an application processor as described in embodiments above, e.g. operative to run software programs, provide interfaces to applications, etc. Shared memory 504 is memory accessible by the host processor 502, e.g. over a bus 503 in FIG. 8, and can store data used by the host processor 502.

System 500 also includes one or more sensors that provide data to the host processor 502 and/or other processor(s). The sensors can include one or more motion sensors, such as accelerometer 508 or gyroscopes, or other types of sensors, such as pressure sensor 510, compass 512, a camera module 514 (e.g., picture and/or video camera), and a GPS module 516. Herein, the sensors 508-516 may be referred to as "external sensors" or "companion sensors" because they are external to the sensor bridge 520. These sensors provide data and other signals to be used in the functions of the system 500. For example, some of the sensors may include one or more of an analog output for data, a digital output for data, a communication port module for communicating data and including a master and a slave, and timing control for timing data, as shown for sensors 508, 510, and 512. For example, the accelerometer 508, pressure sensor 510, and compass 512 are shown including an analog line for analog voltage output and a voltage reference input, a communication interface line for sending and receiving digital sensor data, and a clock synchronization line for timing signals. In some embodiments, the communication port of the sensors implements a serial communication standard, such as I2C, SPI, USB, or UART, for the communication interface line. Camera module 514 can receive inputs specialized for its function, such as data and/or commands on a serial bus input from another source, and a pixel bus with picture data. GPS module 516 can receive inputs such as data on a serial bus, and data on a precise positioning service (PPS) bus.

A universal sensor bridge 520 is provided between the host processor 502 and the sensors 508-516. The sensor bridge is coupled to the host processor via a bus 506. In some embodiments, other components can be coupled to the bus 506 as a multidrop bus, such that the sensor bridge 520 can be one of the components on a multidrop bus 506 that is connected to the host processor 502.

Sensor bridge 520 includes a motion processor 522 which includes one or more processors and which can be used as an intermediary processor between the sensors 508-516 and the host processor 502. The motion processor 522, for example, can perform similar functions as the MPU 20 or motion processor 312 described above. Memory (or FIFO) 524 can also be included in the sensor bridge 520 to store data as needed, e.g., to store sensor data retrieved by the sensor bridge 520 and/or data to be used by the host processor 502.

The sensor bridge 520 includes one or more channels, where each channel can be used to send and received signals from one of the sensors 508-516. Each channel is independent of the other channels, to allow multiple sensors to communicate with the sensor bridge using the same protocol or different protocols simultaneously. Each channel is provided by an associated channel module 528, each of which includes a master/slave module 530, sensor registers 532, timing configuration 534, and an analog-to-digital converter (ADC) 536.

Master/slave module 530 provides a master and/or slave component for appropriate protocols used by the sensor bridge 520. In the described embodiment, the module 530 supports multiple different communication protocols, and can use any of those protocols as instructed by the configuration and control block 568. For example, in one embodiment the module 530 can support I2C, SPI (Serial Peripheral Interface), USB (Universal Serial Bus), and UART (Universal Synchronous Receiver/Transmitter) standard protocols and extensions of these protocols. For protocols that use a master/slave system, the module 530 can act as that master and/or slave. For example, the master/slave module 530 can act as a master to a slave in an external sensor 508-516, or as a slave to the master in the host processor 502 in pass-through mode. The module 530 sends and receives data and other signals on a communication bus 540.

Each master/slave module 530 of the sensor bridge 520 can support a different communication protocol simultaneously. In some embodiments, serial communication protocols can be used, and all modes of serial communication that are used in such protocols can be provided. In some embodiments, each module 530 uses the same communication bus 540, and can use different dedicated lines of the bus 540 for each communication protocol. For example, two of the lines of bus 540 can be used with I2C by one master/slave module 530, four other lines for use with SPI by a different module 530, etc. In other embodiments, the same lines can be shared for use with multiple modules, and/or with multiple communication protocols. For example, time division multiplexing can be used to share lines with multiple channels and/or different protocols.

Sensor registers 532 each store data and other signals received by the associated master/slave module 530. The modules 530 can write the data to the registers as it is received from the sensors 508-516, for example. Data written in the registers 532 can be written to the memory 524 over the communication bus 540, or provided to the motion processor 522. In some embodiments, the data in sensor registers 532 can also be provided to the host processor 502 through the pass-through control 570.

A timing configuration block 534 is provided in each channel module 528 to control timing of signals and manage the timing requirements between the sensor bridge 520 and the external sensors 508-516. Timing signals are sent and received over a timing bus 542 to which each timing configuration block 534 is connected. Clock synchronization signals can be sent or received over the timing bus 542. The clock synchronization allows an external sensor 508-516 to receive or provide signals synchronized with the channel module 528, so that events and timing can be synchronized between the sensor bridge 520 and the sensors 508-516. For example, interrupts or other forms of semaphore or token sharing can be provided via the timing configuration block 534. The dedicated camera module 514 and the GPS module 516 also can use timing signals on the timing bus 542. For example, the dedicated camera module 514 can output "shutter valid" or "frame valid" signals, indicating the timing as to when a picture has been taken. The GPS module can use clock synchronization signals on timing bus 542 for its operation. In some embodiments, one or more of the external sensors 508-516 generate timing signals (or provide timing signals which the sensors have received from another source), which are sent to one or more timing configuration blocks 534 and used to synchronize a channel of the sensor bridge 520 to each of the external sensors. In other embodiments, a timing configuration block 534 can generate timing signals to synchronize an external sensor 508-516 to the sensor bridge 520. In still other embodiments, independent timing is provided between an external sensor 508-516 and the channel module 528 without the use of synchronization signals.

An ADC 536 can be provided in each channel module 528 to convert a received analog signal to a digital signal. For example, in some embodiments one or more of the external sensors 508-516 can provide sensor data in the form of analog signals. These analog signals can be provided on an analog bus 544 that is connected to each sensor 508-516 that has an analog output and is also connected to each ADC 536 of the sensor bridge channels. The ADC 536 and analog bus 544 allows, for example, the channel modules 528 to provide a programmable voltage reference signal to one or more of the external sensors 508-516, and to acquire analog output signals from the external sensors 508-516 and convert the analog signals to digital values. In addition, the channel modules 528 can provide calibration for the external sensors 508-516. For example, to detect whether a sensor drifts in its output values over time, the received output values can be compared to previous received values to determine if there is drift. If drift has occurred, the calibration can include sending another voltage reference signal to correct the drift at the sensor, or the drifted signals can be compensated for in the sensor bridge 520 by addition and subtraction of appropriate offsets.

One or more internal sensors 548 can also be provided in the sensor bridge 520. For example, sensor 548 shown in FIG. 8 is a gyroscope sensor. Each sensor 548 can include an analog output, digital output, timing configuration, and ADC, which operate similarly to the similar components in the external sensors 508-516 and/or in the channel modules 528. The internal sensor 548 can be connected to the communication bus 540, and/or can be connected to an analog bus and timing bus internal to the sensor bridge 520 (not shown).

Configuration and control block 568 is provided to control the operation of the sensor bridge 520. Control block 568 can receive instructions from the host processor 502 and/or from the motion processor 522 to configure the operation of the sensor bridge 520, including setting one or more protocols on the channels of channel modules 528, configuring the timing and analog interface of the channels of modules 528 with respect to the external sensors, configuring the operation of the pass-through control 570, configuring the memory in which data is stored and how sensor data is stored, etc. Control block 568 can include registers, control logic, and memory, for example, to enable this functionality.

A pass-through control 570 is used to select different buses for desired communication according to the present inventions. For example, the control 570 can select multidrop bus operation or point-to-point bus operation to be used according to one aspect of the present invention. Other embodiments may use different configurations, such as different selectable multidrop buses and no point-to-point buses. The pass-through control 570 is connected to the communication bus 540 and to the host processor 502 and the interface 572. The pass-through control 570 includes a multiplexer which can include, for example, a number of switches, each switch controlling whether or not an associated line of the communication bus 540 can provide a signal through the pass-through control 570 to allow the host processor 502 to be directly connected to the communication bus 540. Each line of the bus 540 can thus be independently connected through control 570 using a control signal for each switch of the multiplexer in pass-through control 570.

Interface 572 is included in sensor bridge 520 to interface the host processor 502 with the motion processor 522 and sensor bridge 520. The configuration and control block 568 is connected to the interface 572 to allow the host processor 502 to provide instructions via the interface 572 for configuration of the sensor bridge. Motion processor 522 within the sensor bridge 520 can also be connected to the interface 572 to interface with the host processor 502, and to provide to or receive instructions from the configuration and control block 568. The pass-through control block 570 is also connected to the interface 572. The interface 572 can include appropriate signal lines for particular protocols which are appropriate for communication by the host processor and for the multidrop bus 506 on which the host processor 502 is connected, such as I2C and/or SPI standards. Interface 572 can also include a switch that can select whether the host processor 502 communicates with sensor bridge 520 via the interface 572, or directly through the pass-through control 570 (bypassing the interface 572).

General purpose I/O 574 is also provided in sensor bridge 520. Motion processor 522 is connected to the general purpose I/O 574 to allow connection of the motion processor 522 to the memory bus 506 that is connected to the shared memory 504. In some embodiments, the general purpose I/O 574 is used to pass data to the shared memory 504 and is not used to pass commands, programs, etc. General purpose I/O can be a parallel interface, for example, to allow a fast transfer of data from the motion processor 522 and memory 524 to the shared memory 504 on a bus 503 that is a parallel bus. The general purpose I/O can be used by the sensor bridge 520 to write data to shared memory 504 even during pass-through mode enabled by the pass through control 570 when the motion processor is disconnected from the host processor 502.

I/O level configuration control block 576 is provided to configure and control the electrical signal interface for the inputs, outputs, buses, and channels of the sensor bridge 520. For example, if the accelerometer 508 provides one range of voltages on the communication bus 540, and the pressure sensor 510 provides a different range of voltages, the I/O control block 576 can regulate the voltages to a standard level used by the sensor bridge 576. In some embodiments, the I/O control block 576 need not regulate the voltages on the analog bus 544 since that uses its own voltages and regulation.

In general use, the sensor bridge 520 operates by receiving sensor data from the external sensors 508-516 at one or more channel modules 528 and stores the received data in the sensor registers 532 of the receiving modules 528. Timing signals are provided between the external sensors and sensor modules 528 using the timing bus 542, and any analog sensor signals use the analog bus 544. The motion processor 522 can store the data in the sensor registers 532 to the memory 524 if appropriate. For example, the sensor data can be written to the memory/FIFO 524 before it is overwritten in the sensor registers with additional sensor data from an external sensor, to allow a history of sensor readings to be used for particular applications. The memory 524 can also store sensor data received from any internal sensors 548 on the communication bus 540. Sensor data from the memory 524 can be written by the motion processor 522 to the shared memory 504 via the general purpose I/O 574.

The dual modes of the interface can operate as follows. In non-pass-through mode (or point-to-point mode in some embodiments using point-to-point bus(es)), the host processor communicates with the sensor bridge 520 using bus 506, which can be a multidrop bus. For example, the motion processor 522 can communicate with the host processor 502 via the interface 572 and bus 506. In this mode, the sensor bridge 520 communicates with the external sensors 508 using point-to-point communication, using the buses 540, 542, and 544. This allows, for example, a higher speed of communication to be used between the external sensors 508-516 and the sensor bridge 520 without taking away bandwidth from the multidrop bus 506.

To change operation of the sensor bridge 520 to the pass-through mode, the host processor 502 commands this mode to be initiated. In some embodiments, the host processor can instruct the configuration and control block 568 to set the switches in the pass-through control 570. For example, the host processor can inform the configuration and control block 568 that pass-through mode is active, and indicate the particular communication protocol that the host desires to communicate in (if pass-through mode is active). The particular protocol determines how many lines of the communication bus 540 are needed for communication by the host processor, and thus how many lines and which particular lines through pass-through control 570 should be selected to be active. For example, the I2C protocol may use only two of the lines in bus 540, while the SPI protocol may use four particular lines.

The pass-through control 570 is connected to the host processor 502 allows communication of the host processor 502 with the external sensors. If the pass-through control block 570 is selected to close the appropriate switches on the lines of the communication bus 540 routed through the control 570, then pass-through mode is active and the host processor communication bypasses the interface 572 and the motion processor 522 and is routed through pass-through control 570, so that the host processor can directly use the channel modules 528 of the sensor bridge 520 to communicate directly with one or more of the external sensors 508-516 on the communication bus 540. Since the host processor communicates through the pass-through control 570 over the multidrop bus 506, this in effect is a multidrop mode in which the external sensors 508-516 can communicate on the multidrop bus 506.

The pass through mode using a multidrop bus allows multiple components to communicate with each other. However, a multidrop bus can also be used in non-pass-through mode instead of or in addition to a point-to-point bus. For example, multiple components can be connected to a multidrop bus on either or both sides of the sensor bridge 520. For example, components such as host processor 502, shared memory 504, and other components can be connected to multidrop bus 506 on the host processor side of the sensor bridge 520. At the other side of sensor bridge 520, one or more external sensors 508-516 can also be connected in a multidrop bus fashion in some embodiments. For example, multiple accelerometers 508 can each be connected to the communication bus 540 in a multidrop configuration. In some embodiments (in non-pass-through mode), the connection through the sensor bridge 520 is a point-to-point bus connection, with a multidrop bus on either side of the bridge 520.

If the pass-through control 570 is set by the configuration and control block 568 for its switches to be open, then the communication bus 540 routed through the pass-through control 570 is disconnected such that non-pass through mode is active, and the host processor communicates with the sensor bridge 520 through the interface 572.

Thus, the present invention allows buses to be selected based on desired data communication, whether the buses are multidrop and/or point-to-point. This selection is performed using a multiplexer having first and second positions, only one of the positions being selectable at a time. The first position selectively couples a sensor and a device component using a first bus, and the second position selectively couples the sensor and the motion processor using a second bus.

Communication of information over the second bus does not influence a communication bandwidth of the first bus. This allows, for example, more efficient communication between system components of the first bus and between components on the second bus.

Figure 9:
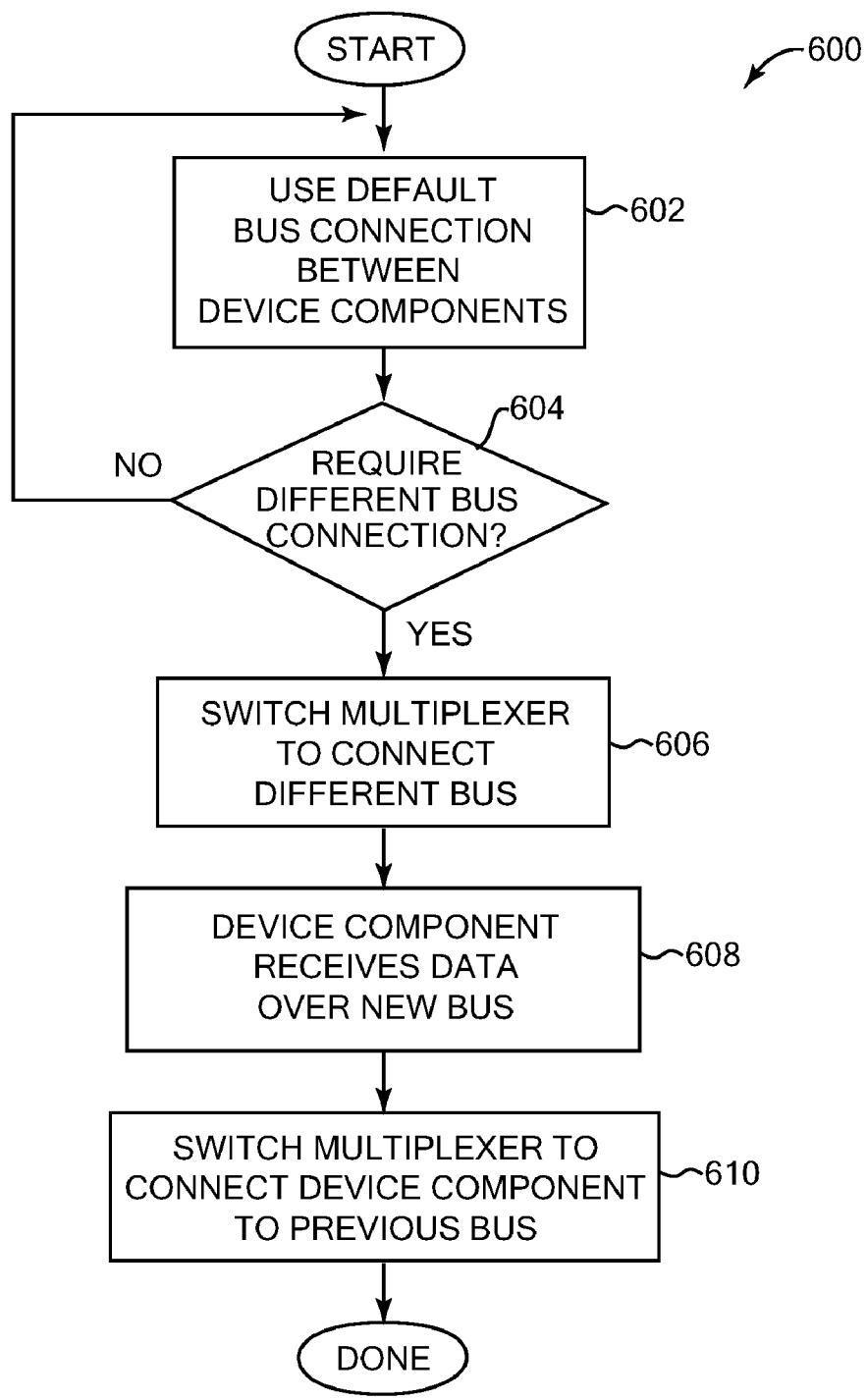
FIG. 9 is a flow diagram illustrating a method of the present invention for operating a motion sensing device with a selectable bus in accordance with one or more of the above embodiments.

FIG. 9 is a flow diagram illustrating one example of a method 600 for operating a motion sensing device in accordance with one or more of the above embodiments. In a step 602, a default bus connection is used between at least two of the device components of the motion sensing device. For example, in some embodiments, the default bus connection may be a multidrop bus connection. In other embodiments, the default connection may be a point-to-point connection, such as one example of the embodiment of FIG. 9 in which the external sensors 508-516 are sending data to the sensor bridge 520 over a point-to-point connection. At step 604, it is checked whether a different bus connection is required. For example, if the default is a multidrop connection, it can be checked whether any of the device components requires a rate of data communication at a higher rate (e.g. above a predetermined threshold rate) than available using the multidrop bus. For example, a device component such as module 306 may require the reception of motion data from one or more motion sensor device components. For example, this requirement may arise when the device is put into a motion sensing mode by a user, requiring the motion processor to receive motion data in real time and process it to determine the direction and magnitude of the motion of the device in space in or around one or more axes of motion. Such motion data may be, for example, acceleration data from the accelerometers and/or gyroscope data from the gyroscopes. In another example, in embodiments in which the default connection was a point-to-point connection, the host processor may want to switch to a multidrop bus connection to communicate directly with one or more sensors. Or, the motion sensing device may have exited a motion sensing mode, so that motion data no longer needs to be sent to the motion processor. Or, the device may have entered a mode requiring slower-rate transmitting and processing of motion data, which if implemented on a multidrop bus would not significantly disturb other communication on the multidrop bus.

If it is determined that a different bus connection is needed for one or more of the device components, then in step 606 at least one multiplexer or switch of the device component(s) is switched such that a different bus connection is made. For example, a multidrop bus connection can be severed for the device component(s) and a point-to-point bus connection established between the device components. In one example, the motion sensing device is switched such that a multidrop bus connection is severed for the motion sensors and a point-to-point bus connection is established between the motion processor and the motion sensor(s) to communicate low-level motion data from the motion sensor to the motion processor. In a different example, a point-to-point bus connection is severed, master and slave relationships established, and a multidrop bus connection is established. In step 608 the device component receives data over the newly-switched bus. For example, high frequency data from any motion sensors external to the motion processor can be provided on a dedicated, newly-active point-to-point bus to the motion processor. The motion processor can integrate and/or otherwise process the data as needed to determine the motion of the device. In other embodiments, data from one or more sensors can be provided to the host processor, and/or data from the processor provided to the sensors, over a newly-connected multidrop bus.

In some embodiments, the device component is switched back to the previous bus at step 610. For example, if the previous bus was a multidrop bus, this re-establishment of the multidrop bus can allow communication with other device components, e.g., the motion processor of the module 306 may determine high-level data describing motion as determined by the motion processor from the low-level motion data from the motion sensors. The module 306 may send this high-level data to the application processor 302 over the previous multidrop bus. In other embodiments, the motion processor can also be the application processor of the device, so that such communication would not be necessary over the bus. Or, if the previous bus was a point-to-point bus, switching back to the point-to-point bus in step 610 allows the fast communication over this bus to resume, e.g., allows the motion processor in sensor bridge 520 to process received data at a fast rate and send processed data to the host processor 502.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art.

What is claimed is:

1. A module for a motion sensing device, the module comprising:
   a motion processor connected to a device component and a first motion sensor; and
   a multiplexer having first and second positions, only one of the positions being selectable at a time, the first position selectively coupling the first motion sensor and the device component using a first external bus, and the second position selectively coupling the first motion sensor and the motion processor using a second external bus, wherein communication of information over the second external bus does not influence a communication bandwidth of the first external bus.

2. The module of claim 1 wherein the first external bus is a multidrop bus and the second external bus is a point-to-point bus.

3. The module of claim 2 wherein the multidrop bus and the point-to-point bus use at least some of the same set of lines between the processor and the first motion sensor.

4. The module of claim 2 wherein the point-to-point bus uses a subset of the lines used for the multidrop bus.

5. The module of claim 2 wherein the multidrop bus uses a separate set of lines than the point-to-point bus.

6. The module of claim 1, wherein the first motion sensor senses motion of the device with respect to at least a first axis, and further comprising a second motion sensor sensing motion of the device with respect to at least a second axis.

7. The module of claim 6 wherein the first motion sensor or the second motion sensor is included with the motion processor and the switch in the module of the motion sensing device.

8. The module of claim 6 wherein the first motion sensor is at least one accelerometer and the second motion sensor is at least one gyroscope or at least one magnetometer.

9. The module of claim 8 wherein the first motion sensor includes at least three accelerometers, and wherein the second motion sensor includes at least three gyroscopes.

10. The module of claim 7 wherein the device component is an application processor that includes a first bus master for the first external bus.

11. The module of claim 10 further comprising a second bus master, wherein the first bus master is connected to the first motion sensor using the first external bus while the switch is in the first position, and wherein the second bus master is connected to the first motion sensor using the second external bus while the switch is in the second position.

12. The module of claim 2 wherein the multidrop bus is an Inter-Integrated Circuit (I2C) bus or a Serial Peripheral Interface (SPI) bus.

13. The module of claim 2 wherein the motion sensor includes an associated multiplexer having two positions, wherein only one of the positions is selectable at a time, a first of the positions selectively coupling the motion sensor in a multidrop bus connection, and the second of the positions selectively coupling the associated motion sensor in a point-to-point bus connection.

14. A motion sensing device, the device comprising:
  a plurality of device components, the device components including:
    a motion sensor operative to sense motion of the motion sensing device;
    a sensor bridge including a motion processor; and
    an application processor;
  at least one bus connecting each device component to one or more of the other device components; and
  a multiplexer having first and second positions, only one of the positions being selectable at a time, the first position selectively coupling the motion sensor and the application processor using a first external bus, and the second position selectively coupling the motion sensor and the motion processor using a second external bus, wherein communication of information over the second external bus does not influence a communication bandwidth of the first external bus.

15. The motion sensing device of claim 14 wherein the first external bus is a multidrop bus and the second external bus is a point-to-point bus.

16. The motion sensing device of claim 14 further comprising a memory coupled to the application processor and external to the sensor bridge, wherein the sensor bridge is coupled to the memory by a parallel bus and the motion processor is operative to store data from the motion processor directly into the memory.

17. The motion sensing device of claim 14 wherein the sensor bridge includes at least one channel module coupled to the motion sensor, the channel module and the motion sensor coupled to each other via a communication bus and a timing bus.

18. The motion sensing device of claim 17 wherein the at least one channel module includes a control module coupled to the communication bus, a timing configuration block coupled to the timing bus, and at least one sensor register that stores sensor data received from the motion sensor.

19. The motion sensing device of claim 18 wherein the sensor bridge includes a memory operable to store sensor data received from the at least one sensor register.

20. The motion sensing device of claim 14 wherein the motion sensor is one of a plurality of sensors coupled to the sensor bridge, and wherein the sensor bridge includes a plurality of channel modules, each channel module coupled to at least one of the sensors.

21. The motion sensing device of claim 18 wherein while the multiplexer is in the first position, the application processor uses the at least one channel module to connect to the motion sensor.

22. The motion sensing device of claim 14 wherein the sensor bridge further comprises a configuration and control block, the configuration and control block receiving instructions from the application processor indicating which of the positions to set the multiplexer, and indicating a communication protocol the application processor is to communicate such that a number of lines connected to the multiplexer are selected to be active, the number of lines being appropriate to the communication protocol.

23. The motion sensing device of claim 14 wherein the sensor bridge includes at least one internal motion sensor, the internal motion sensor providing sensor data to the motion processor.

24. The motion sensing device of claim 18 wherein the at least one channel module includes an analog-to-digital converter that is coupled to an analog bus, and wherein the motion sensor provides an analog output that is output on the analog bus.

25. The motion sensing device of claim 14 wherein the motion sensor is at least one accelerometer or at least one gyroscope.

26. The motion sensing device of claim 15 wherein the multidrop bus and the point-to-point bus use at least some of the same set of lines between the motion processor and the motion sensor.

27. The motion sensing device of claim 15 wherein the multidrop bus is an Inter-Integrated Circuit (I2C) bus or a Serial Peripheral Interface (SPI) bus.

28. A method for providing communication between device components in a motion sensing device, the method comprising:
  providing a multidrop bus connection between at least two of the device components of the motion sensing device;
  determining that a motion processor of the device components is to receive motion data from a motion sensor of the device components; and
  changing at least one multiplexer of the motion sensing device such that the multidrop bus connection is severed for the motion sensor and a different bus connection is established between the motion processor and the motion sensor to communicate the motion data from the motion sensor to the motion processor, wherein communication of information over the different bus connection does not influence a communication bandwidth of the multidrop bus connection.

29. The method of claim 27 wherein the different bus connection is a point-to-point bus connection.

30. The method of claim 28 wherein the motion sensor is an accelerometer and the motion data describes acceleration of the motion sensing device in space.

31. The method of claim 28 wherein the motion sensor includes at least one accelerometer.

32. The method of claim 28 wherein the multidrop bus connection is provided between device components including the motion sensor and an application processor.

* * * * *